United States Patent [19]
Schurman

[11] Patent Number: 6,083,579
[45] Date of Patent: Jul. 4, 2000

[54] BLOW MOLDED ARTICLE

[75] Inventor: Peter T. Schurman, Woodbridge, Conn.

[73] Assignee: The Plastic Forming Company, Inc., Woodbridge, Conn.

[21] Appl. No.: 08/162,372

[22] Filed: Dec. 7, 1993

[51] Int. Cl.[7] ................................................ B29D 24/00
[52] U.S. Cl. ........................ 428/34.1; 428/35.7; 428/189; 428/192; 220/469; 220/339; 220/521; 220/522; 206/373
[58] Field of Search ................................ 428/34.1, 35.7, 428/189, 192; 220/469, 339, 521, 522; 206/373

[56] References Cited

U.S. PATENT DOCUMENTS

| | | |
|---|---|---|
| 417,979 | 12/1889 | Borcherdt ................................ 220/522 |
| 2,672,232 | 3/1954 | Kessell, Jr. ............................... 220/521 |
| 2,685,363 | 8/1954 | Falk et al. ................................ 220/522 |
| 2,783,874 | 3/1957 | Brown et al. ............................ 220/522 |
| 3,327,841 | 6/1967 | Schurman ................................ 206/349 |
| 3,795,265 | 3/1974 | Schurman et al. ........................ 150/0.5 |
| 3,828,969 | 8/1974 | Schurman ................................ 220/315 |
| 3,933,243 | 1/1976 | Schurman ................................ 206/349 |
| 4,101,033 | 7/1978 | Schurman ................................ 206/521 |
| 4,611,713 | 9/1986 | Byrns ...................................... 206/349 |

Primary Examiner—Michael A. Williamson
Attorney, Agent, or Firm—Bachman & LaPointe, P.C.

[57] ABSTRACT

A blow molded hollow doubled wall article wherein the inner wall has an edge portion and a central portion adjacent the edge portion, including at least one opening in the central portion providing access to the space between the inner and outer walls and forming a flap member connected to said edge portion.

9 Claims, 3 Drawing Sheets

BLOW MOLDED ARTICLE

BACKGROUND OF THE INVENTION

The present invention relates to blow molded articles of blow molded thermoplastic material, especially hinged complementary portions which together form a closable container. The blow molded article of the present invention includes an integral double wall structure having an outer wall and an inner wall.

It is known in the art to form container cases including a base and a cover which are assembled together to form a finished product including a hinge section permitting the container components to open and close. The hinge can be formed integrally with the container parts or separately therefrom.

At least one of the components, that is, the cover component and/or the base component, desirably contains portions intended for article storage. These can be integrally molded or provided by means of separate formed separator elements. It is highly desirable to provide the container with greater adaptability for storage of articles therein either in the lid component or in the base component or both. It is particularly desirable to provide a blow molded article as described above including a double walled component wherein one can better utilize the space between the walls resulting in a container having increased flexibility for storage of various components.

Accordingly, it is the principal object of the present invention to provide a hollow doubled wall article having improved storage capacity.

It is a still further object of the present invention to provide an improved article as aforesaid, especially a closable container, effectively utilizing the space between the inner and outer wall of at least one of the components thereof.

Further objects and advantages of the present invention will appear hereinbelow.

SUMMARY OF THE INVENTION

In accordance with the present invention, the foregoing objects and advantages are readily obtained.

The blow molded article of the present invention comprises: a blow molded, hollow, double walled article having an inner wall and an outer wall substantially parallel to each other and forming a space therebetween, and a connecting wall connecting the inner and outer walls and running substantially perpendicular to the inner and outer walls; wherein the inner wall has an inner wall face including an edge portion thereof adjacent the connecting wall and a central portion adjacent the edge portion; and at least one opening in the inner wall face, generally in the central portion, providing access to the space between the inner and outer walls and forming at least one flap member integral with the connecting wall and generally integral with said edge portion, i.e., the flap member is formed of the same material as the connecting wall as a continuation thereof. The flap is movable towards and away from said outer wall to form a movable separating member spaced from the outer wall. The opening in the central portion preferably comprises a cut portion of the central portion having components thereof essentially perpendicular to each other. Desirably, the cut portion is essentially U-shaped forming a movable flap member connected to the edge portion along one side of the flap member.

The present invention is extremely versatile and enables a variety of advantageous embodiments. Thus, for example, a form can be affixed to the movable flap having impressions therein for receiving articles. Also, the cut portion or portions may form at least two of said flap members wherein at least two of said flap members may be defined by U-shaped cut portions forming at least two movable flap members spaced from the outer wall.

The flap is desirably connected to the edge portion by a hinge-like connection permitting movement of the flap towards and away from the outer wall.

In a further advantageous embodiment, the cut portion or portions may define a ledge member adjacent the edge portion for storage of articles.

Further advantageous features of the present invention will appear hereinbelow.

BRIEF DESCRIPTION OF THE DRAWINGS

The present invention will be more readily understood from a consideration of the following illustrative drawings.

DETAILED DESCRIPTION OF PREFERRED EMBODIMENTS

Figures 1, 2:
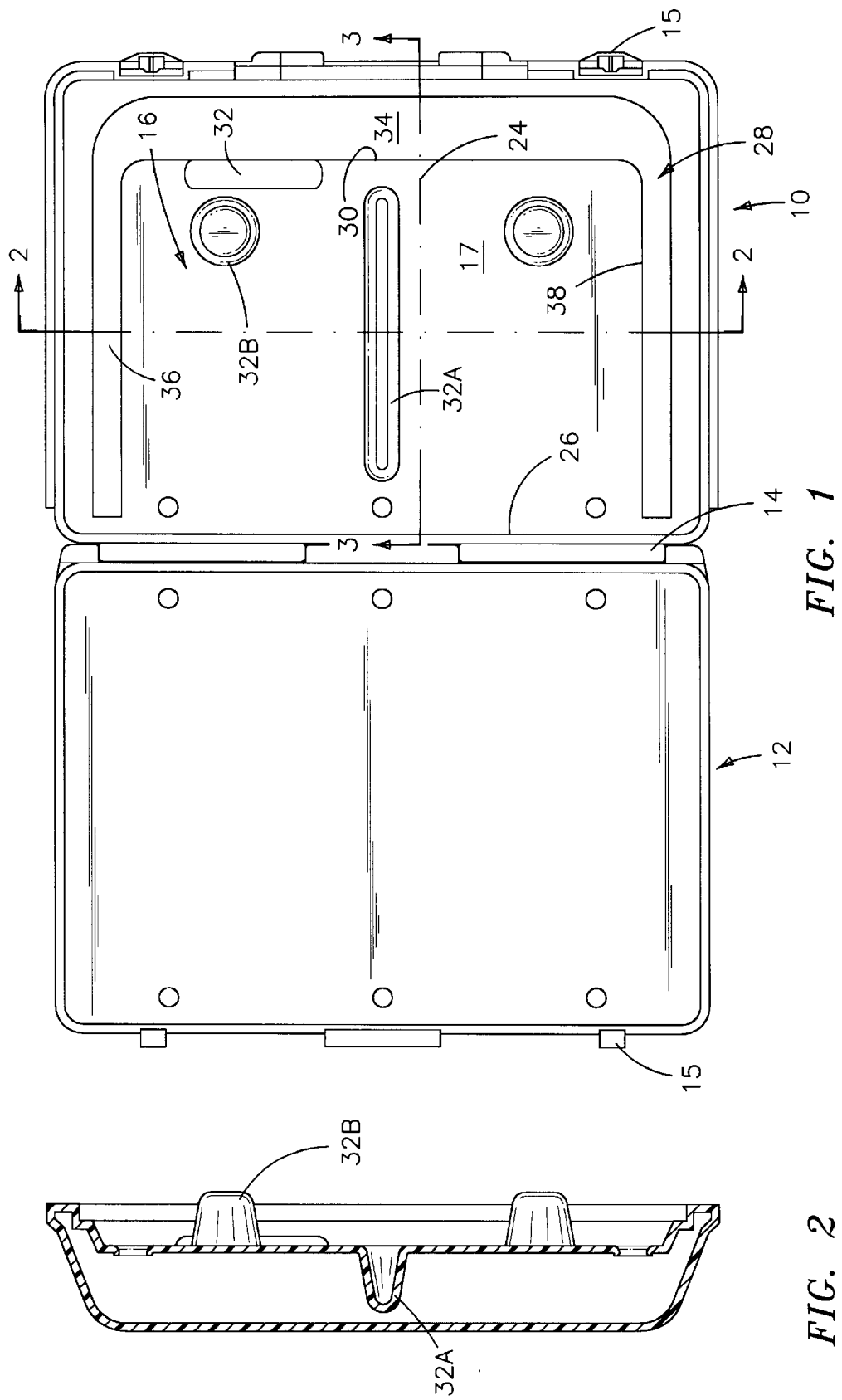
FIG. 1 is a top plan view of the blow molded article of the present invention in the form of a container having a cover and a base which are hinged together.
FIG. 2 is a view along lines 2—2 of FIG. 1.
Figure 3:
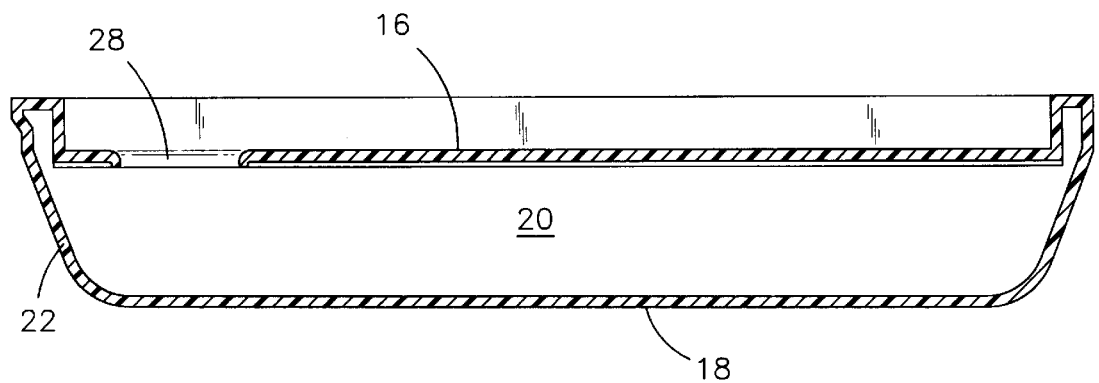
FIG. 3 is a view along lines 3—3 of FIG. 1.

The present invention relates to blow molded, hollow, double walled articles such as shown in FIGS. 1–4. As illustrated in FIGS. 1–4, the article of the present invention may comprise a complementary lid or cover member 10 and a body or base member 12 connected by a hinge 14 and including latch members 15 for securing the cover and base members in the closed condition. The cover and/or base members are blow molded from a polymeric material and at least one of these comprises a double walled structure, as for example the cover member 10 including inner wall 16 having an inner wall face 17 and outer wall 18 substantially parallel to each other forming a space 20 therebetween, plus connecting wall 22 connecting the inner outer and outer walls and running substantially perpendicular to the inner and outer walls.

Containers of the type shown in the drawings are designed to receive a wide variety of articles, either as a custom built container to receive a given article or articles or as a general carry-all receptacle. It is highly desirable to provide increased adaptability in the utilization of space volume, especially with respect to the space between the inner and outer walls.

Figure 4:
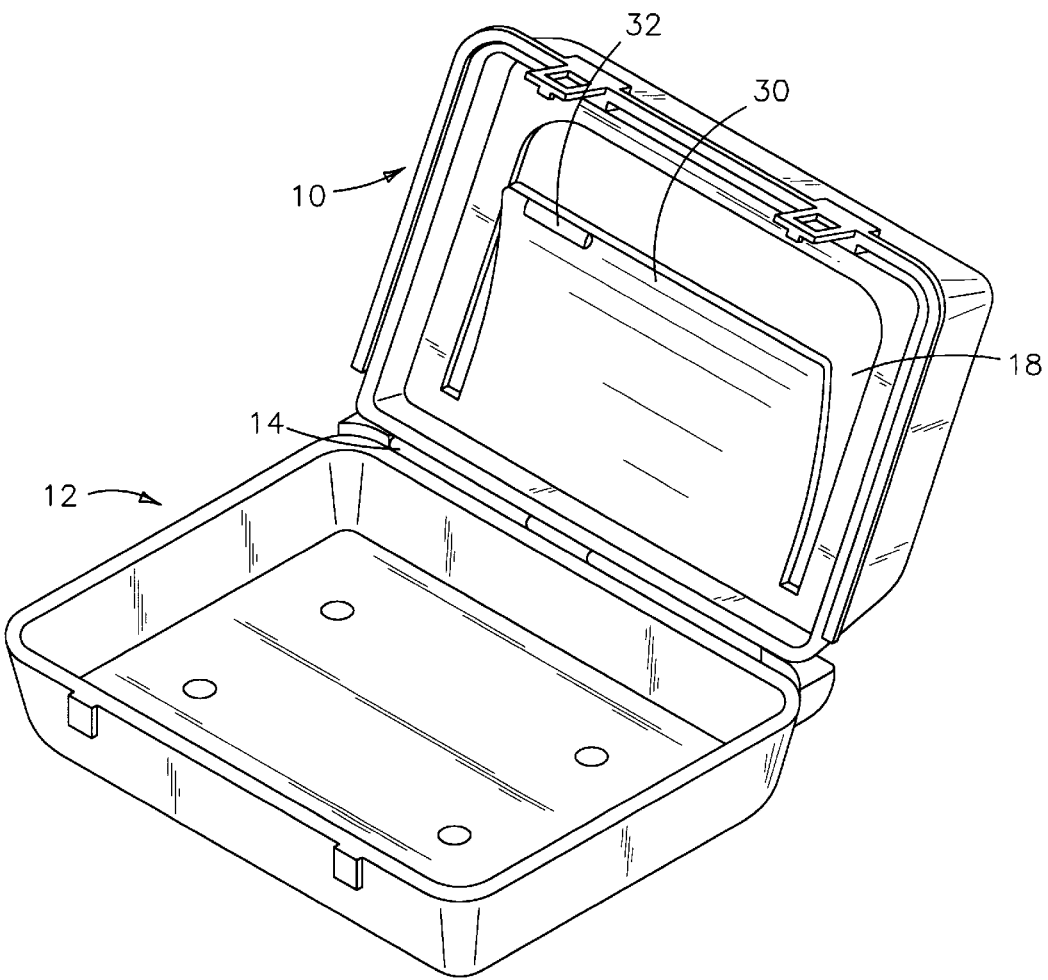
FIG. 4 is a view of the article of FIG. 1, partially closed, with the flap member moved away from the outer wall of the cover.

Referring to the drawings, the inner wall face 17 includes a central portion 24 and an edge portion 26 with the edge portion being situated adjacent connecting wall 22. The inner wall face 17 includes at least one opening 28 therein forming a flap member 30 integral with connecting wall 22. Desirably, opening 28 is located in the central portion 24 so that flap member 30 is integral with both edge portion 26 and connecting wall 22. As shown in FIG. 4, flap member 30 is movable towards and away from outer wall 18 and provides an integrally connected, movable flap for convenient storage of articles, such as papers, blueprints, various articles, therebehind. The integral connection to the connecting wall provides a firm hinge-like connection permitting movement of the flap towards and away from the outer wall.

The cut portion 28 may be formed by routing or any convenient means and may have a cut width as desired, keeping in mind the desirability of convenient access to space 20. Handle portion 32 may be molded to flap 30 to enable one to conveniently grasp flap 30.

As shown in FIG. 1, cut portion 28 may desirably have a U-shape with leg 34 running essentially parallel to hinge 14 and legs 36 and 38 running essentially perpendicular thereto. Cut portion 28 in FIG. 1 partly circumscribes the major portion of inner wall face 17 forming a large flap member 30. The U-shaped construction is particularly advantageous as it enables one to form a large and convenient flap member. Connection of the flap member to the connecting wall adjacent hinge 14 as shown in FIG. 1 is also advantageous as it enables one to obtain a practically usable space behind the flap member for storage of articles therein. This construction greatly increases the ease of inserting, retaining and removing articles behind flap 30 and it retains a considerable amount of storage surface behind the flap and also helps hold down articles in the base.

In a closed case, it is desirable to prevent flap wall 16 from sagging inward towards outer wall 18, i.e., to keep flap wall 16 in its molded plane which is essentially parallel to outer wall 18. Naturally, when a specific article is placed in space 20, the article itself may keep the flap from sagging inward. However, when the use of space 20 is not exactly defined, it is desirable to mold at least one spacer means, as rib 32A or at least one boss in flap 16 extending towards outer wall 18 which will minimize the amount by which flap wall 16 could sag inward and maintain the inner and outer walls essentially parallel to each other. Rib 32A may also form a divider between two storage pockets. Rib 32A should not be included if it will interfere with desired storage.

Alternatively, in the closed case it is desirable to keep flap wall 16 from sagging towards base 12. Normally articles in the base are positioned so that their top surfaces abut inner wall face 17. However, it may be desirable to include at least one spacer means such as bosses 32B or one or more ribs in flap 16 extending towards base 12 which will minimize the amount by which flap wall 1E could sag towards base 12 and may contact a surface of the base when the case is closed. Here again, this feature should not be included if it will interfere with desired storage.

Figure 6:
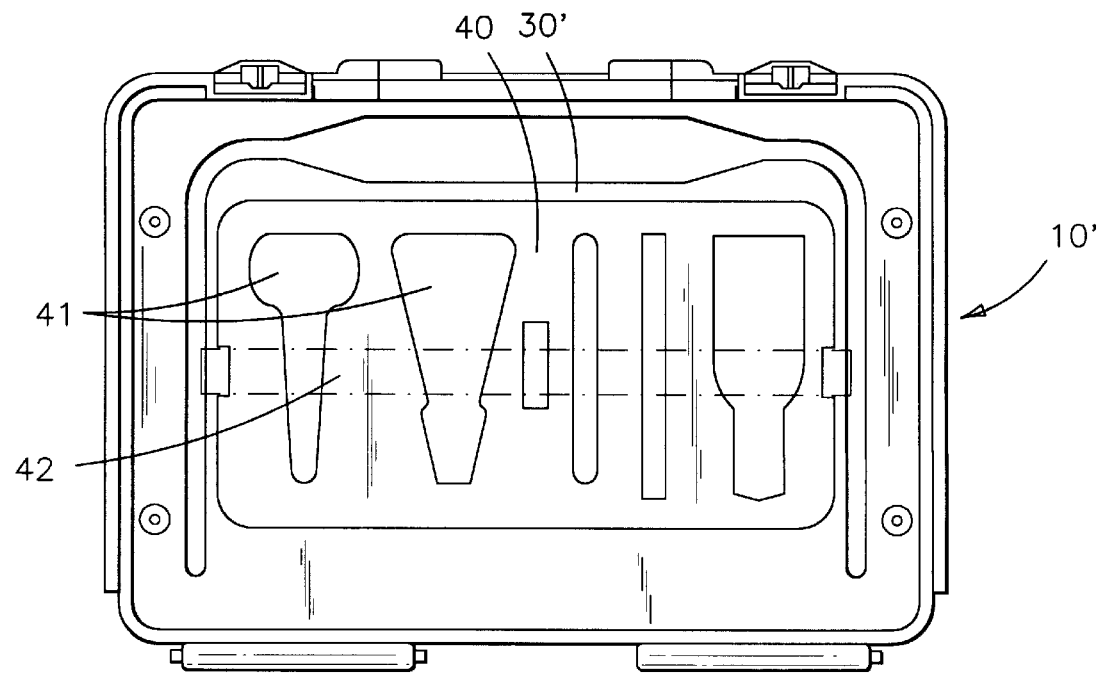
FIG. 6 is a plan view of a cover showing a further embodiment of the present invention.

The embodiment of FIG. 6 shows cover member 10' with movable flap member 30' similar to flap member 30 in FIG. 1. Form 40 is secured to flap member 30' and includes therein impressions 41 for receiving articles. Holding means, as an elastic member 42, is provided around the form and the flap to secure the desired articles in the form. The holding means may be of any desired material, as a foam or molded plastic material.

Figure 5:
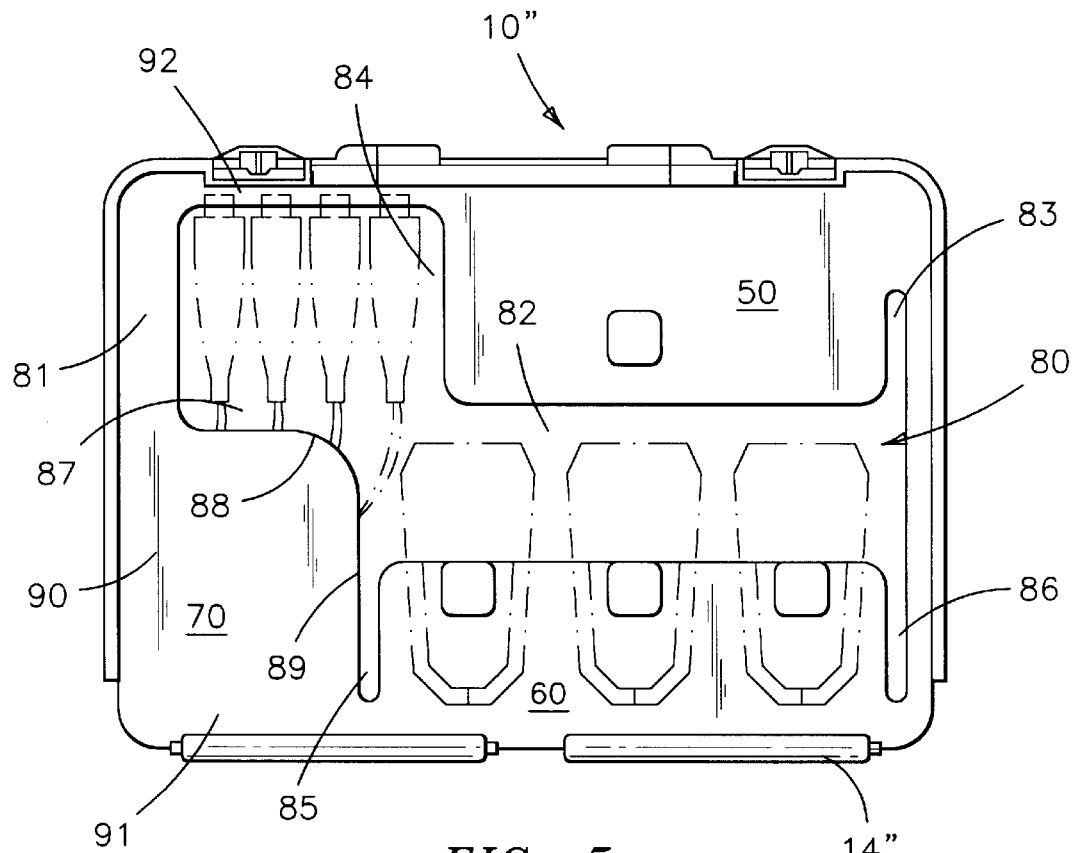
FIG. 5 is a plan view of a cover showing an alternate embodiment of the present invention.

The article of the present invention may include a plurality of flap members as shown in FIG. 5. FIG. 5 shows cover member 10" including three (3) flap members 50, 60 and 70 defined by opening 80 cut into inner wall face 83 so that the flap members are integral with the connecting walls as in FIGS. 1–4 (not shown in FIG. 5). The flap members are movable towards and away from the outer wall of cover member 10" as in FIGS. 1–4.

Flap members 50 and 60 are defined by a U-shaped cut portion with flap 50 defined by cut portion leg 82 running essentially parallel to hinge 14" and legs 83 and 84 running essentially perpendicular thereto, and flap 60 is defined by cut portion 82 and legs 85 and 86 running essentially perpendicular to cut portion 82. Flap 70 is defined by cut portions 85 and 87 which run essentially perpendicular to each other forming a flap with two sides 88 and 89 facing cut portion 80 and two sides 90 and 91 facing the connecting wall.

Thus, a versatile article is provided for storage of numerous articles as shown in phantom on FIG. 5.

In addition, cut portion 80 may define a ledge member 92 adjacent the connecting wall for additional storage capacity as to clip on articles as shown in phantom in FIG. 5.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A blow molded article comprising:
    a blow molded, hollow, double walled article having an inner wall and an outer wall substantially parallel to each other and forming a space therebetween, and a connecting wall connecting the inner and outer walls and running substantially perpendicular to the inner and outer walls;
    wherein said inner wall has an inner wall face including an edge portion thereof adjacent the connecting wall and a central portion adjacent the edge portion;
    at least one essentially U-shaped opening in the inner wall face, said opening being a cut portion of the central portion having components thereof essentially perpendicular to each other, providing access to the space between the inner and outer walls and forming at least one flap member integral with said connecting wall, wherein said flap member is movable towards and away from said outer wall to form a movable separating member spaced from the outer wall, said movable flap member being integrally connected to said edge portion along one side of said flap member by a hinge-like connection permitting movement of the flap towards and away from the outer wall;
    wherein said at least one opening in the inner wall face is in the central portion, wherein the flap member is integral with said edge portion; and
    wherein said article includes a cover member and a base member complementary to each other and hinted together along a hinge portion wherein said flap member is situated on the cover member and wherein said flap member is integral with said edge portion solely adjacent said hinge portion.

2. An article according to claim 1 wherein said cut portion partly circumscribes the major portion of the inner wall face.

3. An article according to claim 1 including a form affixed to said flap member having impressions therein for receiving articles.

4. An article according to claim 1 wherein said cut portion forms at least two of said flap members.

5. An article according to claim 4 wherein at least two of said flap members are defined by U-shaped cut portions.

6. An article according to claim 1 wherein said flap member is connected to said connecting wall by a connection permitting movement of said flap member towards and away from the outer wall.

7. An article according to claim 1 wherein said cut portion also defines a ledge member adjacent said connecting wall.

8. An article according to claim 1 wherein said flap member includes at least one spacer means extending towards the outer wall.

9. An article according to claim 1 wherein said flap member includes at least one spacer means extending towards the base.

* * * * *